Figure 1:
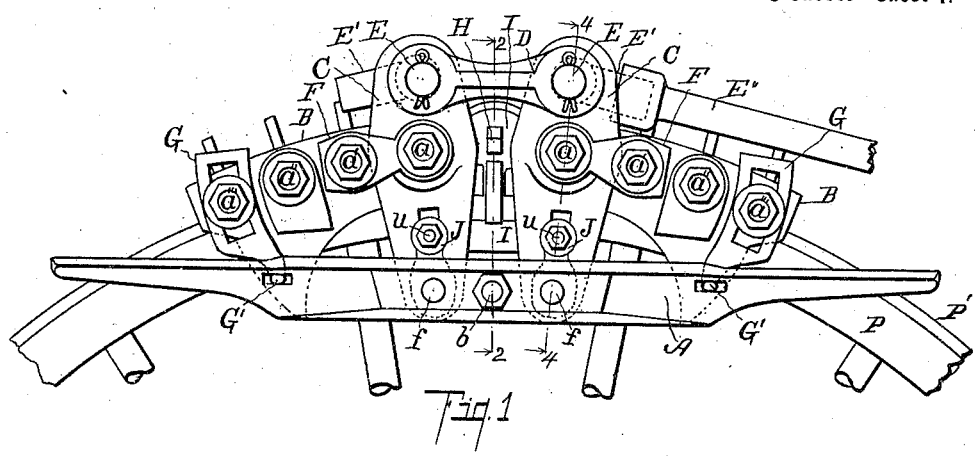

No. 679,161. Patented July 23, 1901.
W. SCHAU.
TIRE TIGHTENER.
(Application filed Jan. 28, 1901.)
(No Model.) 3 Sheets—Sheet I.

Witnesses:
Inventor,
William Schau
By Fred L. Chappell
Att'y.

No. 679,161. Patented July 23, 1901.
W. SCHAU.
TIRE TIGHTENER.
(Application filed Jan. 28, 1901.)
(No Model.) 3 Sheets—Sheet 2.
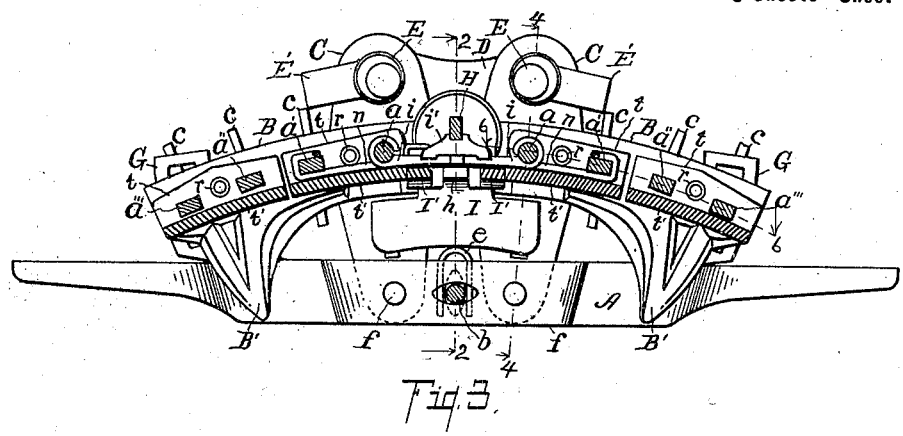
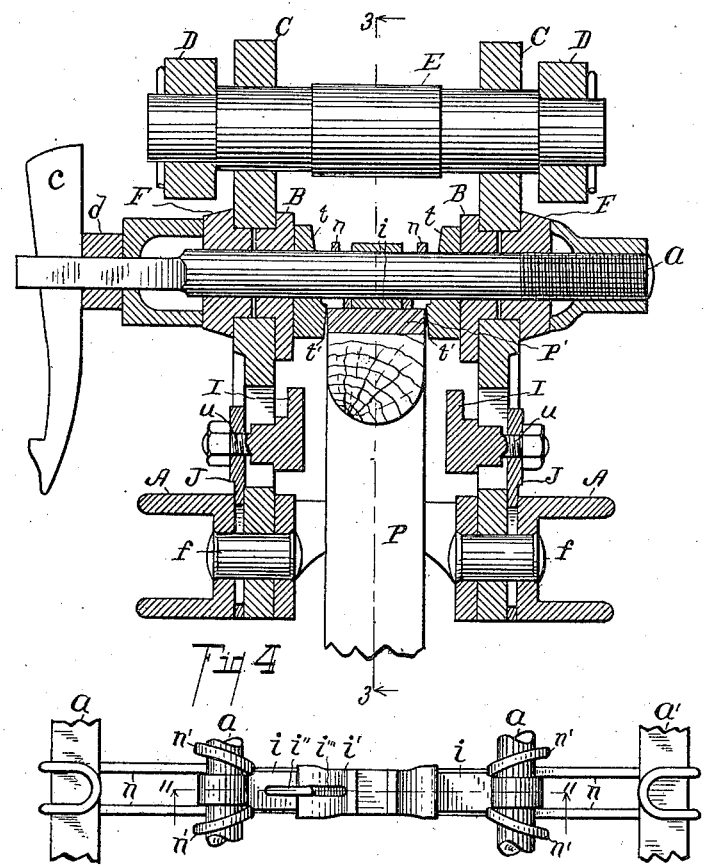
Witnesses:
D. Eldred Wood.
Otis A. Earl
Inventor,
William Schau
By Fred L. Chappell
Atty.
THE NORRIS PETERS CO., PHOTO-LITHO., WASHINGTON, D. C.

No. 679,161. Patented July 23, 1901.
W. SCHAU.
TIRE TIGHTENER.
(Application filed Jan. 28, 1901.)
(No Model.) 3 Sheets—Sheet 3.
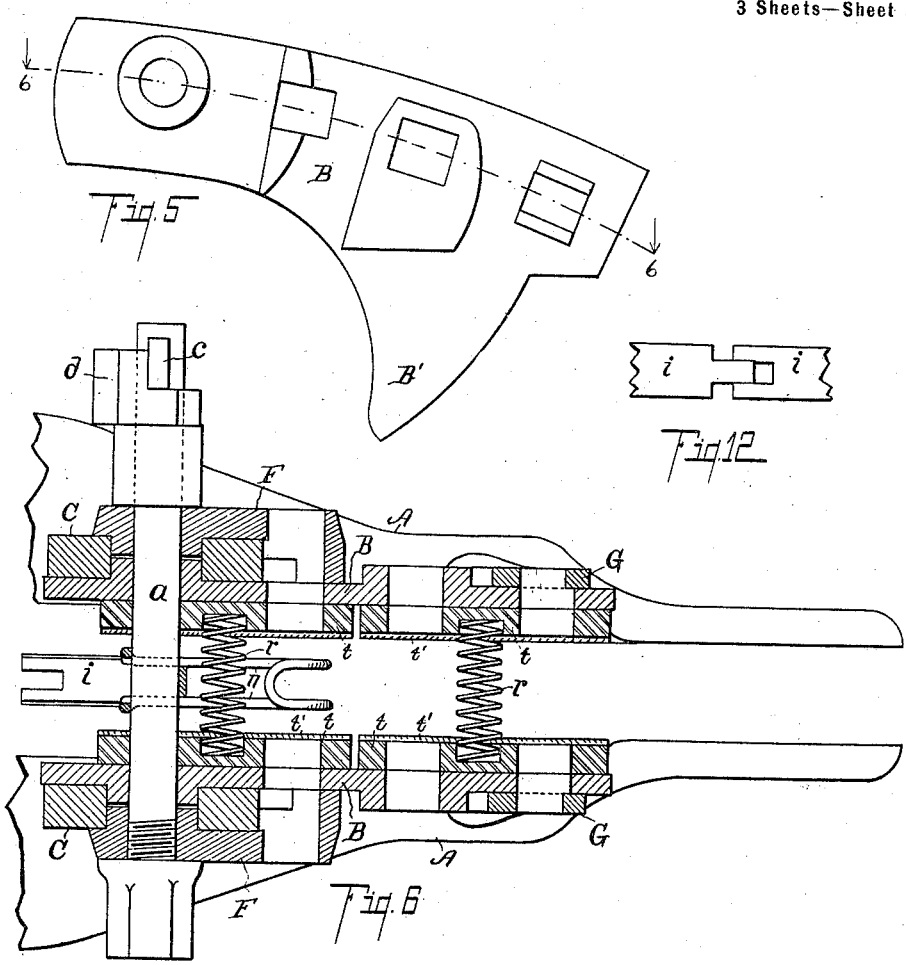
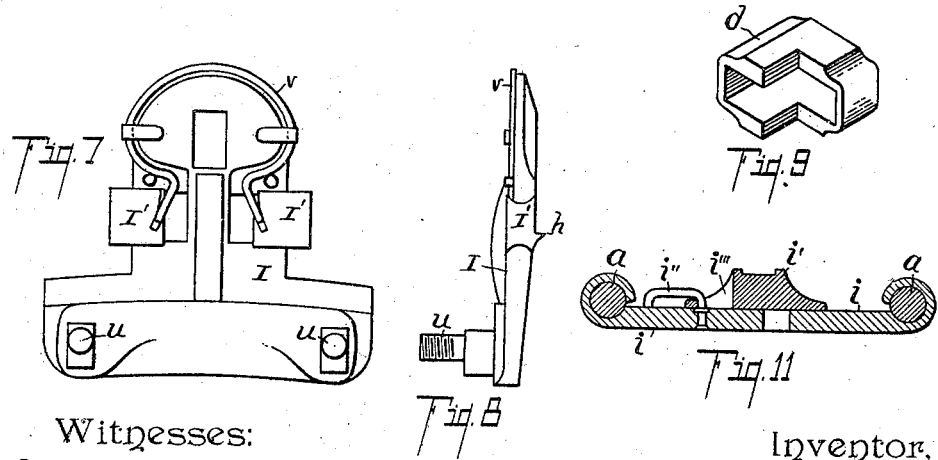
Witnesses:
D. Eldred Wood.
Otis A. Earl.
Inventor,
William Schau
By Fred L. Chappell
Atty.
THE NORRIS PETERS CO., PHOTO-LITHO., WASHINGTON, D. C.

UNITED STATES PATENT OFFICE.

WILLIAM SCHAU, OF SHEFFIELD, ALABAMA.

TIRE-TIGHTENER.

SPECIFICATION forming part of Letters Patent No. 679,161, dated July 23, 1901.

Application filed January 28, 1901. Serial No. 45,095. (No model.)

*To all whom it may concern:*

Be it known that I, WILLIAM SCHAU, a citizen of the United States, residing at the city of Sheffield, in the county of Colbert and State of Alabama, have invented certain new and useful Improvements in Tire-Tighteners, of which the following is a specification.

This invention relates to improvements in means for tightening or setting the tires of vehicles without removing them from the fellies or wheels.

This invention relates to improvements and advantageous modifications of the tire-tightener patented to me in United States Letters Patent No. 632,152, dated August 29, 1899. I have found some modifications and improvements in the general design of my improved tire-tightener to be desirable in order to make the same more efficient to the ends sought, and I find that it has been possible to greatly simplify the structure and increase its effectiveness and the speed of operation.

The particular objects of this invention are, then, first, to simplify the entire structure; second, to make the structure completely and quickly adjustable for use, making it what might be called "self-adjusting;" third, to provide an improved adjusting means for adapting the machine to tires of different widths as well as to wheels of different sizes; fourth, to provide improved engaging jaws for the tire in this relation that avoid any possibility of injury to the felly; fifth, to provide improved retaining and guiding means for the tire to positively prevent the same buckling or being raised into a loop at the point of tightening; sixth, to provide an improved tire-tightener in which the working parts are easily accessible, so that it will be possible by inspection to note the exact adjustment of the machine; seventh, to provide an improved actuating means for the tire-guides, which insures a positive movement of the same in both directions, and, eighth, to provide an improved structure for guiding the tire-tightener into position.

Further objects will definitely appear in the detailed description to follow.

I accomplish the objects of my invention by the devices and means described in this specification.

The invention is clearly defined and pointed out in the claims.

A structure embodying the features of my invention is clearly illustrated in the accompanying drawings, forming a part of this specification, in which—

Figure 2:
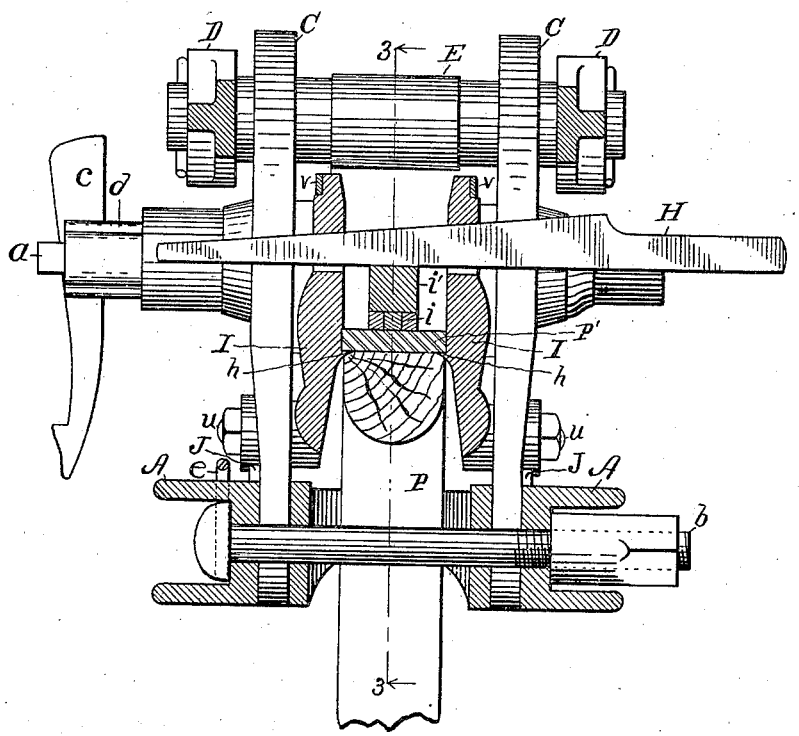

Figure 1 is a side elevation of my improved tire-tightener as it appears in position on a vehicle-wheel, one of the operating-lever handles being omitted and the other being shown broken off. Fig. 2 is an enlarged detail transverse vertical sectional elevation taken on a line corresponding to line 2 2 of Figs. 1 and 3. Fig. 3 is a longitudinal vertical sectional elevation of a machine, taken on a line corresponding to line 3 3 of Figs. 2 and 4. Fig. 4 is an enlarged transverse sectional elevation taken on a line corresponding to line 4 4 of Figs. 1 and 3. Fig. 5 is an enlarged detail view of one of the side plates B, which serves to support the jaws and carry the same during manipulation. Fig. 6 is an enlarged detail sectional view taken on a line corresponding to the curved line 6 6 of Figs. 3 and 5, the cross bolts or bars $a'$ $a''$ $a'''$ being omitted. Fig. 7 is an enlarged detail view of one of the central side plates supporting jaws for the engagement and guiding of the tire at that point. Fig. 8 is an end elevation of the same. Fig. 9 is a perspective view of one of the notched washers for use in adjusting the sides to and from each other. Fig. 10 is an enlarged detail plan view of the central top guides for the tire, showing their connections to adjacent parts. Fig. 11 is a sectional view of these plates, taken on line 11 11 of Fig. 10. Fig. 12 is a detail view of the interlapping meeting ends of these plates $i$ $i$.

In the drawings all of the sectional views are taken looking in the direction of the little arrows at the ends of the section-lines, and similar letters of reference refer to similar parts throughout the several views.

Referring to the lettered parts of the drawings, A A are the main side pieces, which serve as the principal support and form the main supporting-frame. These are of sufficient length to extend beyond the ends of the machine and are there curved toward each other to form suitable clamps for engaging the sides of a wheel when the machine is brought into operation. These side pieces are ribbed to give them desired strength without unduly increasing their weight. They contain vertical recesses toward their center, where upright levers C C are pivoted on the pivots $f f$. The upper ends of these levers C C, there being a pair to each side, are connected together by links D, which are on eccentrics on the ends of the shafts E. Studs E' E' are provided to receive hand-operating levers E'' for actuating the eccentrics to and from each other. These levers, eccentrics, and hand-levers are substantially the same as those described in my former patent hereinbefore referred to.

To clamp the sides A A together, so that they will embrace the sides of the wheel, I provide a bolt $b$, having a T-shaped head, oval in outline, which is readily inserted through a similarly-formed opening and turned at right angles, as indicated by dotted lines in Fig. 3, where it may be held in position by the staple-like piece $e$, so that the nut or bur on the opposite end may be screwed down and tightened. This is a quick way of clamping the parts together, as to withdraw the bolt it is only necessary to loosen the bur and turn the head to the horizontal position, when the side plates are released and can be separated and lifted off the wheel. Plates B for carrying the jaw are provided and are loosely supported at each side, so that they may be readily adjusted for the purpose of fitting the same to the tire of a wheel. Downwardly-projecting portions B' are at the outer ends of the same, which extend down and within the said bars or plates A and serve to locate the parts and keep them in alinement. These plates B are exactly similar in function to the plates B of my former patent referred to herein. Bosses are provided around the holes thereof to increase the strength of the coupling and serve as additional guides for the plate. Bolts $a$ $a$ extend through the inner ends of these plates B, (see Figs. 1, 3, 4, and 6,) these bolts being pivot-bolts and coupling the inner ends to the upright levers C at each side. A boss is on the outer side of the plate B and an additional strengthening part F is provided with a boss extending into the same and extending to the next bolt $a'$ to afford additional strength to the coupling. The bolt $a$ is provided with a key $c$ and the slots at one end and a threaded bur at the other. A notched washer $d$ (see Fig. 9) is provided to enable a quick adjustment for wide or narrow widths of tire or felly by adjusting the same, as clearly appears in Fig. 6, where the nut is adjusted for a wide tire and could be adjusted for a narrow tire by loosening the key or bur of the bolt, bringing the sides nearer together, and moving the washer toward the right of the view appearing in Fig. 6. This avoids any extensive turning of the nuts and secures an even adjustment at once. The same kind of washer is provided on all of the bolts $a$ $a'$ $a''$ $a'''$. At the outer end of the plates B is located a slotted coupling G, having a lug G' at the bottom, which extends into a slot in the side plate or bar A below. The slot of this part G embraces the reinforcing-lugs of the outer hole of the plate B and is clamped beneath the washer of the clamping-bolt at that point. This supports the parts always substantially in position for the preliminary adjustment and enables the perfect adjustment of the side plates B, carrying the engaging jaws after the main side pieces A A have been clamped in position. The engaging jaws are made up of perforated plates $t$ at each side, which are supported by the bolts $a$ $a'$ and $a''$ $a'''$, respectively. The bolts $a'$ $a''$ $a'''$ are flattened or squared and extend through square or rectangular apertures in the plates B and are adjustable up and down therein, so that when the tire-tightener is in position these bolts rest upon the tire, and as the bolts carry the plates $t$ with serrated jaws $t'$ these jaws are always moved to the proper position around the periphery of the wheel for engaging the tire. The jaws are beveled on the lower side, so that when drawn up and clamped on the tire they do not come in contact with the felly, but take only a strong grip upon the tire from each side and upset the metal at the center when the hand-levers are operated, thus tightening the tire on the wheel. The central support for the tire of the machine consists of the plate I, with a slot above for the key H, the plate having inwardly-projecting lip $h$, as in my former structure, and jaws I' I' are in recesses to each side, as in the former structure, and are held normally apart by the spring $v$. This part is provided with an additional support and attachment to the side pieces. The levers C are slotted vertically, and lugs $u$, terminating in screw-threaded bolts, extend outwardly through the slots from laterally-projecting portions at the bottom of the plate I. A slotted connection J, having a washer-like form at its upper end, receives the threaded end of the projection $u$ and a screw-nut clamps the same in position. The part J is adjustable up and down on the rivet $f$, it being slotted for that purpose. Springs $r$ are between each pair of jaws $t$ to hold them normally open.

The guides that rest on the periphery of the tire are in this improved structure held in position in such a manner that they can be easily swung up on hinges, so that the conditions and position of the adjacent parts can be readily ascertained. The outer ends of the parts $i$ $i$ are turned into eyes which embrace the bolts $a$ $a$ at each side. A loop of spring-wire surrounds the bolts $a$ at each side, as clearly appears in Fig. 10, and serves to retain and locate these plates centrally, and a center loop is extended and embraces the next adjacent bolt $a'$. As the wire $n$ is of greater thickness than the metal formed into the eye, it rests upon the tire and supports the bolt $a$ at such a height that there is very little friction on the part $i$, which can be easily swung up. The inner ends of the parts $i\ i$ are mortised together, so they can move to and from each other. A block of considerable thickness $i''$ is superimposed upon the same and provided with a suitable seat for the key H. This block is preferably held in position by the loop $i'''$, extending through the longitudinal slot $i''''$ therein. These parts could be otherwise suitably connected together; but I have shown the form which I prefer.

Having thus described and located the various parts of my improved tire-tightener, I will now state the operation of the machine.

The bolt $b$ is first removed and the keys $c$ loosened when the machine is set onto the top of a wheel. The weight of the machine carries the various bolts $a\ a'\ a''\ a'''$ into contact with the tire, and as the bolts control the position of the jaws $t$ they are brought into proper relation to engage the tire. The bolt $b$ is then inserted, as I have before indicated, and the side pieces A are clamped thereby onto the sides of the wheel. The various parts are then adjusted. The eccentrics are thrown into position indicated in Figs. 1 and 3. The guides $i$ are put into position. The part I' is shut down upon the same, retaining them in line by little flanges at each side. The key H is then inserted through the apertures therefor in the plates I I and driven tight into position, and the jaws are all tightened by tightening the bolts $a\ a'$, &c. The eccentrics are then operated, carrying the parts toward each other with a powerful pressure, operating in much the same manner as my former machine. When they are thus brought together, the key H can be driven out and the guides $i$ be opened up by their hinges, and the work performed can thus be readily inspected, which is of very great advantage. From this it will be seen that the operation of my improved tightener is very similar to that of the machine of my former patent. However, there are many advantages in this structure over the same.

The serrated jaws are much simpler to manufacture and, being beveled, do not mar the felly, but engage the tire with powerful pressure. The guides for the central part of the machine is much more securely held in position.

The guiding-plates for the exterior of the tire have a positive action and are easily swung to one side for the inspection of the work. The matter of the clamping-bolt for the main side pieces is greatly simplified and improved.

Having thus described my invention, what I claim as new, and desire to secure by Letters Patent, is—

1. In a tire-tightener, the combination of side pieces A, A; pairs of upright levers pivoted to the center thereof with suitable connections at the tops for actuating the same; side pieces B, B, pivoted to each of said levers having downwardly-extending parts B' extending within the main side pieces A, toward the outer ends of the same; a slotted link G having a lug G' to engage a slot in the side piece A at each side of the machine toward each end; transverse bolts through the said side pieces B, carrying jaw-pieces $t$, all coacting substantially as described for the purpose specified.

2. In a tire-tightener, the combination of side pieces A, A; pairs of upright levers pivoted to the center thereof with suitable connections at the tops for actuating the same; side pieces B, B, pivoted to each of said levers having downwardly-extending parts B' extending within the main side pieces A, toward the outer ends of the same; transverse bolts through the said side pieces B, carrying jaw-pieces $t$, all coacting substantially as described for the purpose specified.

3. In a tire-tightener, the combination of side pieces A, A; pairs of upright levers pivoted to the center thereof with suitable connections at the tops for actuating the same; side pieces B, B, pivoted to each side of said levers; a slotted link G having a lug G' to engage a slot in the side piece A at each side of the machine toward each end; transverse bolts through the said side pieces B, carrying jaw-pieces $t$, all coacting substantially as described for the purpose specified.

4. In a tire-tightener, the combination of the main side pieces A with means of clamping the same onto a wheel; the upwardly-extending pairs of levers pivoted to the center thereof with means of actuating the same to and from each other; plates B extending from said levers outwardly toward the ends of the main pieces A having suitable guides at their outer ends; engaging jaws supported within the plates B; transverse bolts through said plates B provided with both keys and screw-threaded nuts; and the notched washers $d$ to be engaged by said keys for adapting the tire-setter to different widths of tire, for the purpose specified.

5. In a tire-setting machine, the combination of a suitable framework clamping-plates carried by said framework carrying serrated jaws beveled on the side toward the wheel to engage the tire without marring the felly, for the purpose specified.

6. In a tire-tightener, the combination of the main frame upwardly-extending levers pivoted thereto; serrated jaws actuated by said levers; central blocks I with lips $h$ for engaging under the tires having studs $u$ extending through slots in said levers and connections J; and a screw-threaded nut for clamping the said plates I by the said connection to the upright lever to hold the same from an upward movement thereby preventing the buckling of the tire; suitable guide-blocks between said plates I and a key extending through perforations therein to hold the guide-blocks on the periphery of the tire, for the purpose specified.

7. In a tire-tightener, the combination of a suitable framework; actuating-levers for moving pairs of engaging jaws to and from each other; central supporting-blocks with lips to engage beneath the tire; guiding-blocks for resting upon the tire consisting of the hinged part $i, i$, and the superimposed blocks $i'$ hinged to one of the blocks $i$ and a key extending through suitable apertures in the side blocks I for retaining the same in position, coacting for the purpose specified.

8. In a tire-tightener, the combination of a suitable main frame; pairs of side plates carrying engaging jaws for engaging the opposite sides of the tire; guide-plates pivoted to the bolts so that they will be reciprocated thereby and mortised into each other at their inner ends; and wire springs $n$ encircling the bolts at each side of the central guide-plates to support the same above the tire so that they can be easily turned on their hinges, for the purpose specified.

9. In a tire-tightener, the combination of oppositely-situated plates bearing engaging jaws to engage the tire; central guide-plates for the sides of the tire; and guides for the periphery of the tire, the ends of which are mortised together so that they can reciprocate, and the outer ends suitably pivoted so that they can be opened for the inspection of the work, for the purpose specified.

In witness whereof I have hereunto set my hand and seal in the presence of two witnesses.

WILLIAM SCHAU. [L. S.]

Witnesses:
W. J. BELSER,
GEO. T. MCGREGOR.